(12) United States Patent
England et al.

(10) Patent No.: US 8,132,961 B1
(45) Date of Patent: Mar. 13, 2012

(54) FLOW PLUG WITH LENGTH-TO-HOLE SIZE UNIFORMITY FOR USE IN FLOW CONDITIONING AND FLOW METERING

(75) Inventors: John Dwight England, Arab, AL (US); Anthony R. Kelley, Somerville, AL (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 530 days.

(21) Appl. No.: 12/397,973

(22) Filed: Mar. 4, 2009

(51) Int. Cl.
*B01F 5/06* (2006.01)

(52) U.S. Cl. .................................... 366/340

(58) Field of Classification Search ............... 366/340
See application file for complete search history.

(56) References Cited

U.S. PATENT DOCUMENTS

| | | | | |
|---|---|---|---|---|
| 3,645,298 A | * | 2/1972 | Roberts et al. | 138/40 |
| 3,838,598 A | * | 10/1974 | Tompkins | 73/861.52 |
| 7,051,765 B1 | * | 5/2006 | Kelley et al. | 138/44 |

* cited by examiner

*Primary Examiner* — Yogendra Gupta
*Assistant Examiner* — Alison Hindenland
(74) *Attorney, Agent, or Firm* — Peter J. Van Bergen; James J. McGroary

(57) ABSTRACT

A flow plug of varying thickness has a plurality of holes formed therethrough. The plug fits in a conduit such that a fluid flow in the conduit passes through the plug's holes. Each hole is defined by a parameter indicative of size in terms of the cross-sectional area thereof. A ratio of hole length-to-parameter is approximately the same for all of the holes.

27 Claims, 6 Drawing Sheets

FLOW PLUG WITH LENGTH-TO-HOLE SIZE UNIFORMITY FOR USE IN FLOW CONDITIONING AND FLOW METERING

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to flow conditioners and flow meters. More specifically, the invention is a flow plug whose holes exhibit a length-to-size uniformity.

2. Description of the Related Art

There are numerous applications utilizing fluid flow in a conduit where a flow must be conditioned or one or more process variables associated with a fluid flow (e.g., pressure, temperature, mass flow, etc.) must be measured. "Flow conditioners" include simple orifice plates. To measure a variety of flow process variables, a variety of "flow meters" have been developed. Flow meters having no moving parts or power requirements are preferred.

Some flow meters include an orifice plate disposed in a fluid flow. The orifice plate (i.e., a plate with multiple holes passing therethrough) is typically used to condition a flow before and/or after flow measurement instrumentation.

However, this often requires some type of disruption of the flow where the flow measurement instrumentation (e.g., pitot tubes, spinning fans, etc.) is positioned. Furthermore, multi-hole orifice plates of varying hole placement and size can have a high coefficient of discharge. However, in such cases, permanent pressure loss varies widely depending on the pattern of holes. Furthermore, multi-hole orifice plates can produce multiple vena contracta (i.e., downstream location from a flow restrictor where the flow jet area is smallest, flow velocity is largest, and pressure is smallest). These conditions yield permanent pressure losses and yield less than optimal confidence in the flow measurement results generated by such flow meters.

SUMMARY OF THE INVENTION

Accordingly, it is an object of the present invention to provide a flow plug that can be used for flow conditioning and/or flow metering purposes.

Another object of the present invention is to provide a flow plug having no moving parts.

Still another object of the present invention is to provide a flow plug that conditions a fluid flow in a way that a coefficient of discharge, permanent pressure losses, and vena contracta can be optimized.

Other objects and advantages of the present invention will become more obvious hereinafter in the specification and drawings.

In accordance with the present invention, a flow plug of varying thickness has a plurality of holes formed therethrough. The plug is fitted in a conduit such that a fluid flow in the conduit impinges on the plug and passes through its holes. Each hole has a length associated therewith. Each hole is further defined by a parameter indicative of size in terms of the cross-sectional area thereof. A length-to-parameter ratio is approximately equal for all of the holes.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
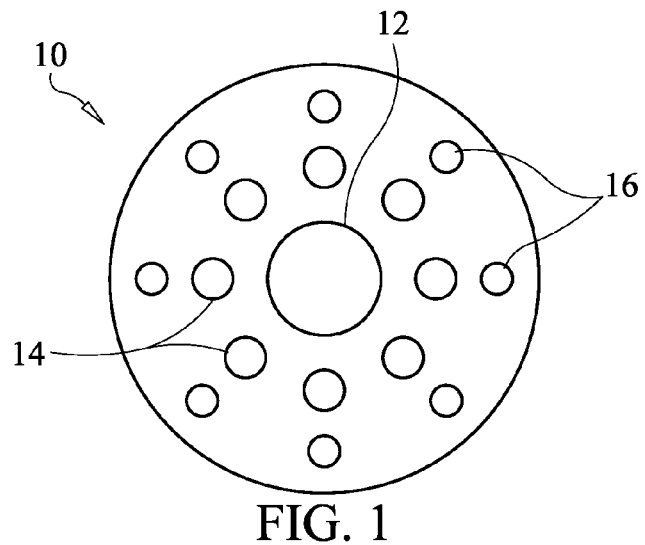
FIG. 1 is an end view of a flow plug having a plurality of circular holes formed therethrough.

The present invention is a flow plug that can be used to condition a flow and/or be used in the measurement of process variables associated with a flow. The flow plug improves constrained fluid flow measurements by (i) producing a more uniform vena contracta for a flow that has been interrupted for measurement purposes, and (ii) being capable of having the plug's coefficient of discharge and efficiency clearly optimized. This improves flow measurement capability while minimizing pressure loss. In general, the flow plug has holes formed therethrough with the plug being installed in a fluid-carrying conduit such that the fluid passes through the plug's holes. All fluid flowing through conduit must pass through the plug's holes. As used herein, the term "plug" includes any structural element that satisfies the constraints that will be described herein. The flow plug can be used to condition a fluid flow such that flow measurements upstream and/or downstream of the plug are facilitated. However, the flow plug can also be configured for instrumentation such that fluid properties are measured as the flow moves through the plug.

The flow plug is readily compatible with existing fittings and current measurement systems and, therefore, does not require special piping, instrumentation, or calculation method changes.

The term "fluid" as used herein refers to any flowable substance to include vapors or gas, homogenous or non-homogenous liquids and slurries. In general, a pipe or conduit will have a flow plug of the present invention fitted therein. A fluid flow moving through the conduit will impinge on the upstream side of the flow plug that is positioned transverse or perpendicular to the fluid flow. The flow plug of the present invention can be shaped to conform to a straight or curved portion of a conduit without departing from the scope of the present invention.

The flow plug can be sized/shaped to work with any size/shape of conduit. For example, the flow plug can be constructed for installation in a cylindrical conduit, a conduit having a rectangular cross-section, etc. Thus, in general, the flow plug can be shaped/sized to fit within any fluid-carrying conduit without departing from the scope of the present invention. Further, the term "plug" as used herein includes a simple element fitted into a conduit as well as a flanged element fitted between the ends of two joined conduits where the flanged element has a plug portion that fills an interior cross-section of the two joined conduits.

In accordance with the present invention, a flow plug's holes sizes/lengths are configured to produce uniformity in terms of the holes' length-to-size ratios for all of the plug's holes. Hole "size" will typically be referenced to a parameter indicative of the hole's flow area. For example and as will be explained further below, the parameter can be a hole's diameter when the holes are circular in cross-section. Another parameter that could be used is the internal surface area of the hole along the length thereof. For a slotted hole, the parameter can be slot width. Other hole/parameter examples will be discussed further below.

Referring now to the drawings and more particularly to FIG. 1, an end view of a flow plug in accordance with an embodiment of the present invention is shown and is referenced generally by numeral 10. In the illustrated embodiment, plug 10 is configured for placement in a cylindrical conduit. Plug 10 can be configured for a snug fit within a conduit, or can include an annular flange captured between two conduit sections as would be understood by one of ordinary skill in the art.

Plug 10 has a plurality of holes formed therethrough. It is to be understood that the number, shape, and entry/exit features of the holes are not limitations of the present invention. In the illustrated embodiment, plug 10 has a central hole 12 having a diameter $D_{12}$, a ring of holes 14 of diameter $D_{14}$ located on a first radius, and another ring of holes 16 of diameter $D_{16}$ located on a second radius. With respect to hole diameter in this embodiment, $D_{12} > D_{14} > D_{16}$. The thickness of plug 10 is varied such that the length-to-diameter ratio for each hole is substantially the same. That is, the length-to-diameter ratio can be identical for all holes, but can also vary slightly to account for velocity profile conditions, stratification, fluid density, etc., as a function of radial location within the conduit.

Figure 2:
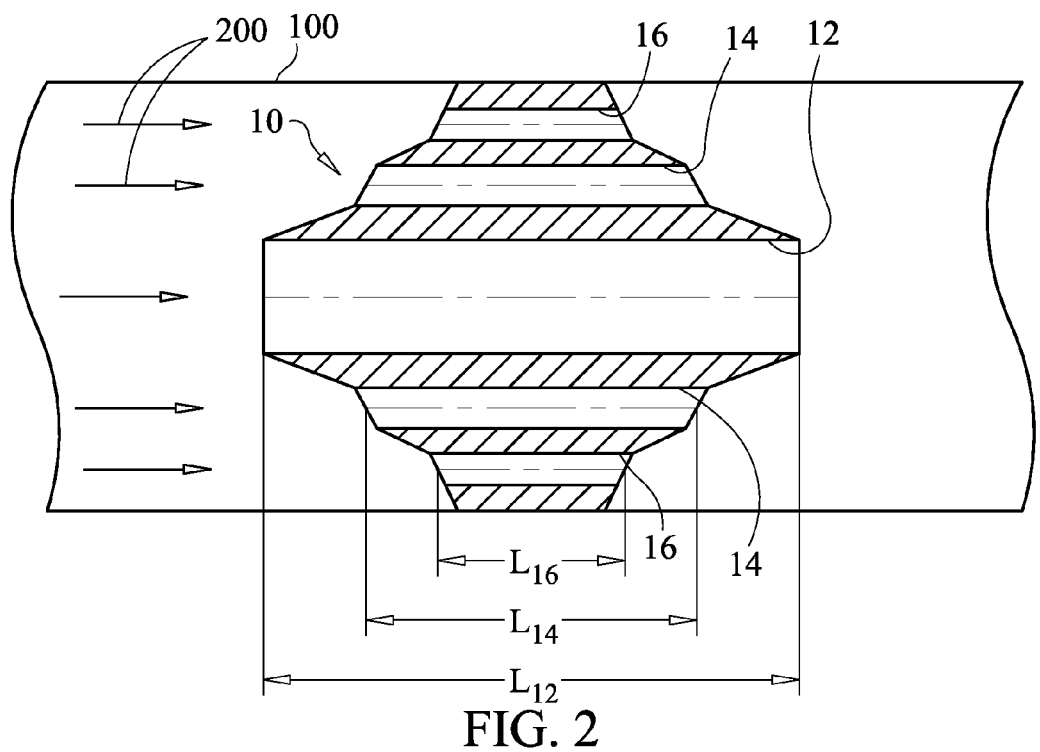
FIG. 2 is an axial cross-sectional view of the circular-hole flow plug in FIG. 1 with the holes being parallel to the direction of fluid flow in accordance with an embodiment of the present invention.
Figure 3:
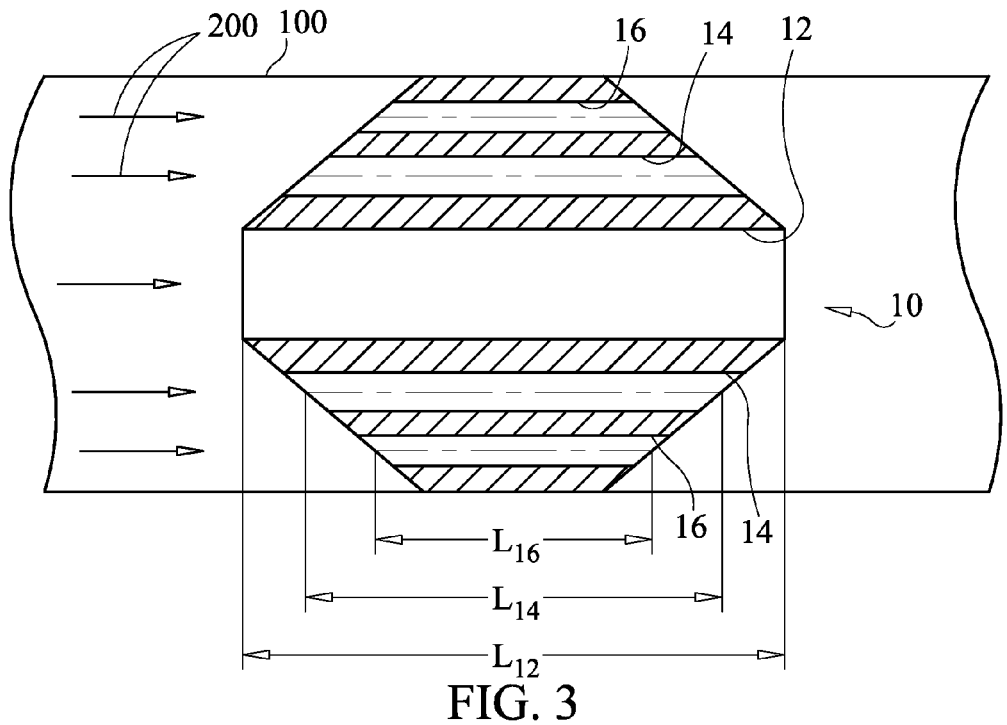
FIG. 3 is an axial cross-sectional view of the circular-hole flow plug in FIG. 1 with the holes being parallel to the direction of fluid flow in accordance with another embodiment of the present invention.
Figure 4:
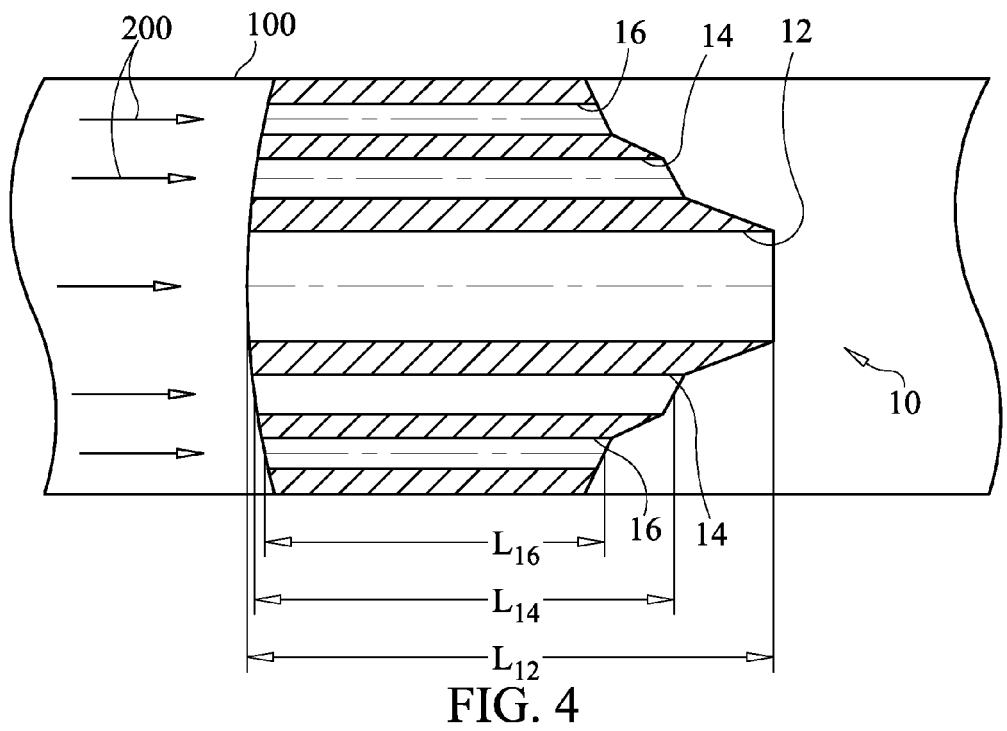
FIG. 4 is an axial cross-sectional view of the circular-hole flow plug in FIG. 1 with the holes being parallel to the direction of fluid flow in accordance with another embodiment of the present invention.

Several possible embodiments of plug 10 that satisfy this criteria are shown in FIGS. 2-4. In each case, plug 10 is placed in a fluid-carrying conduit 100 with an approaching fluid flow indicated by arrows 200. The length of holes 12, 14 and 16 is designated as $L_{12}$, $L_{14}$ and $L_{16}$, respectively. Typically, a hole's length is measured along its central longitudinal axis is shown.

Figure 5:
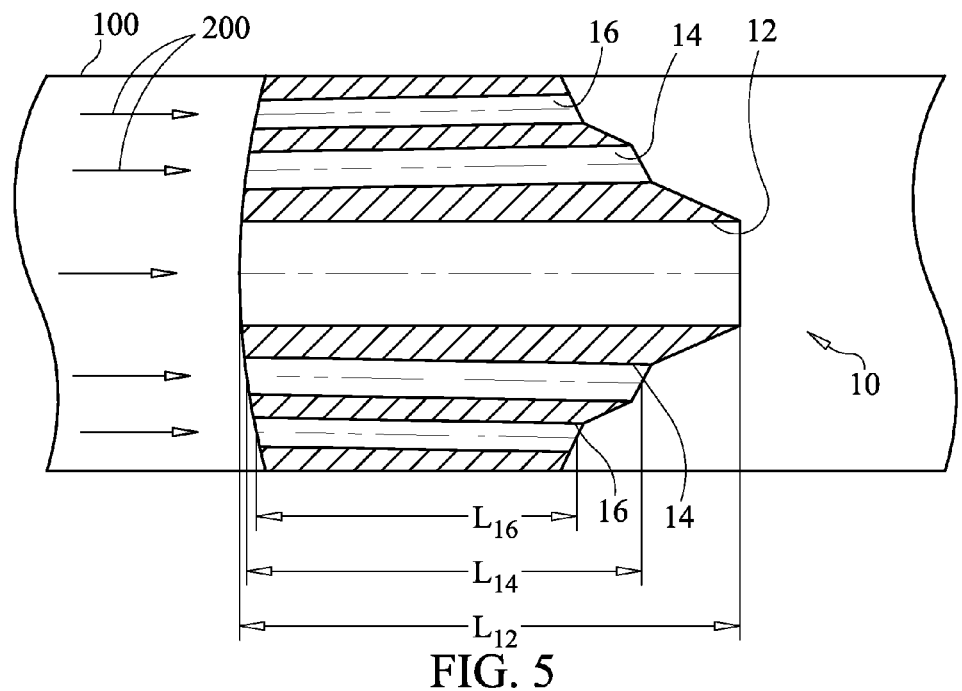
FIG. 5 is an axial cross-sectional view of the circular-hole flow plug in FIG. 1 with some of the holes being non-parallel to the direction of the circular-hole flow plug in FIG. 1 in accordance with another embodiment of the present invention.

For each of the embodiments of plug 10 illustrated in FIGS. 2-4, the holes extending through the plug are parallel to the direction of fluid flow 200 in conduit 100. However, the present invention is not so limited. For example, FIG. 5 illustrates an embodiment of plug 10 in which holes 14 and 16 extend in directions that are not parallel to fluid flow 200. The non-parallel holes 14 and 16 can define straight line paths (as shown) or curved paths without departing from the scope of the present invention.

Figure 6:
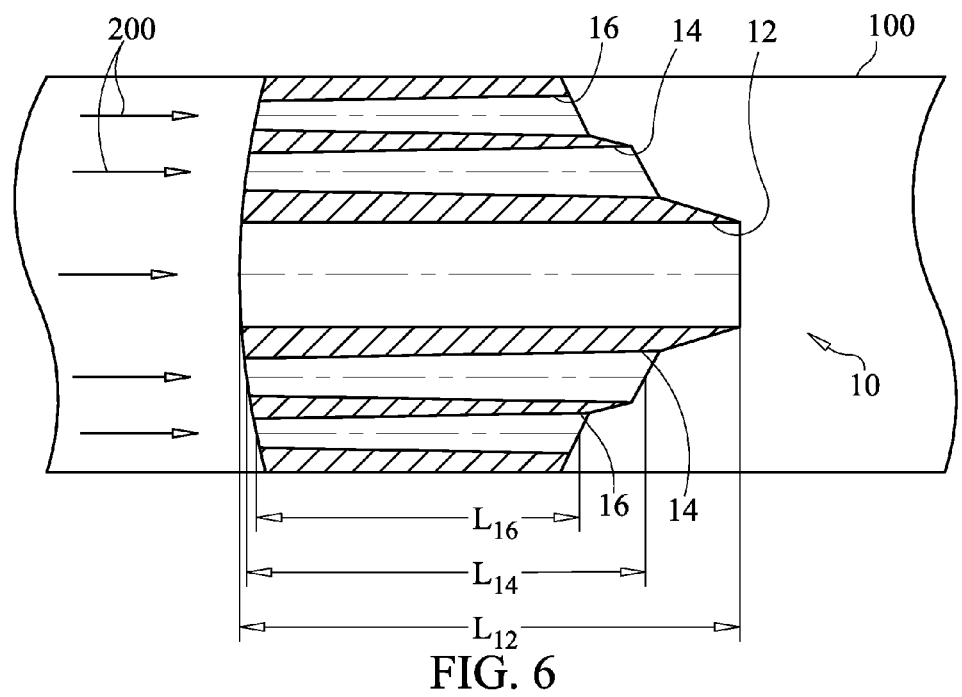
FIG. 6 is an axial cross-sectional view of the circular-hole flow plug in FIG. 1 with some of the holes having a diameter that varies in accordance with another embodiment of the present invention.

For each of the embodiments of plug 10 illustrated in FIGS. 2-5, each of holes 12, 14 and 16 is a constant-diameter hole. However, the present invention is not so limited as FIG. 6 illustrates an embodiment of plug 10 in which the diameter of holes 14 and 16 varies along the length of the hole paths. In this case, an average diameter or percentage of maximum diameter can be used (for holes 14 and 16) when calculating the length-to-diameter ratio. While FIG. 6 depicts holes 14 and 16 that diverge along the direction of fluid flow 200, the plug's holes could also converge along the length thereof without departing from the scope of the present invention.

Figure 7:
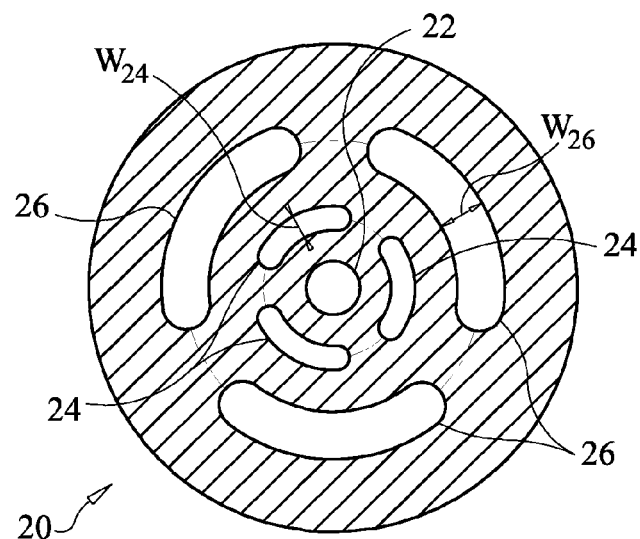
FIG. 7 is a radial cross-sectional view of a flow plug having a plurality of slotted holes formed therethrough in accordance with another embodiment of the present invention.

For each of the embodiments of plug 10 illustrated in FIGS. 2-6, the holes are circular in cross-section. However, the present invention is not so limited as FIG. 7 illustrates a radial cross-section of another plug 20 having slotted holes 24 and 26 distributed on radii about a central circular hole 22. Note that the inclusion of central circular hole 22 is not a requirement of the present invention. In accordance with the present invention, the "length-to-slot width" ratio must be substantially the same for each of slotted holes 24 and 26 where $W_{24}$ and $W_{26}$ are the respective slot widths. For the illustrated embodiment, plug 20 will be thicker in the locale of slots 26 than in the locale of slots 24. If plug 20 includes central circular hole 22, the length-to-diameter ratio thereof should be substantially the same as the above-noted "length-to-slot width" ratio for slotted holes 24 and 26.

Figure 8:
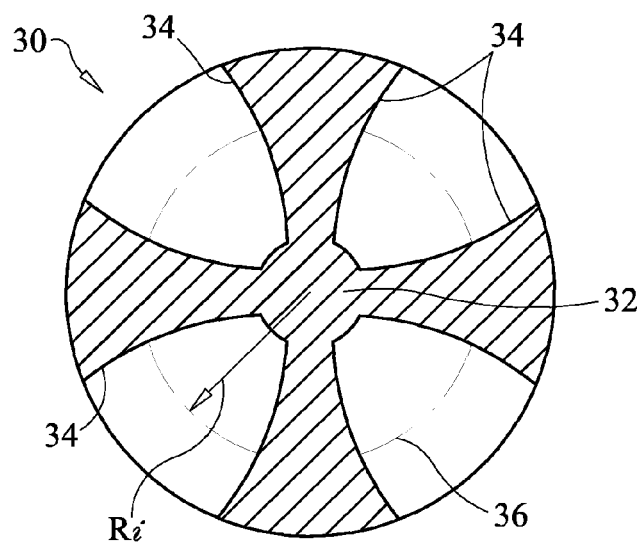
FIG. 8 is a radial cross-sectional view of a flow plug having a plurality of substantially V-shaped holes formed therethrough in accordance with another embodiment of the present invention.

Each of the above-described embodiments of plug 10 and plug 20 make use of discrete holes. However, the present invention is not so limited. For example, FIG. 8 illustrates a radial cross-section of another plug 30 having substantially V-shaped holes 34 extending radially out from a central region 32. Here, the parameter of interest used in the "length-to-size" ratio could be the width or arc length of holes 34 at different radii of holes 34. For instance, the arc length $A_i$ at a given $R_i$ is illustrated by the dashed lines 36 in FIG. 8. Thus, it is to be understood that other parameters of interest indicative of size can be used in the "length-to-size" ratio without departing from the scope of the present invention.

The flow plug of the present invention can be used "as is" to simply condition a fluid flow prior to and/or subsequent to fluid flow measurements. However, the flow plug can also be "instrumented" with one or more sensors (e.g., temperature sensors, pressure sensors, etc.) in order to facilitate the measuring of process variables associated with the fluid flow. To do this, one or more radially-extending holes can be drilled into the flow plug with each such radial hole extending to a fluid path defined by one of the plug's holes described earlier herein. A sensor of choice can then be mounted flush with the sidewall of a fluid path.

Figure 9:
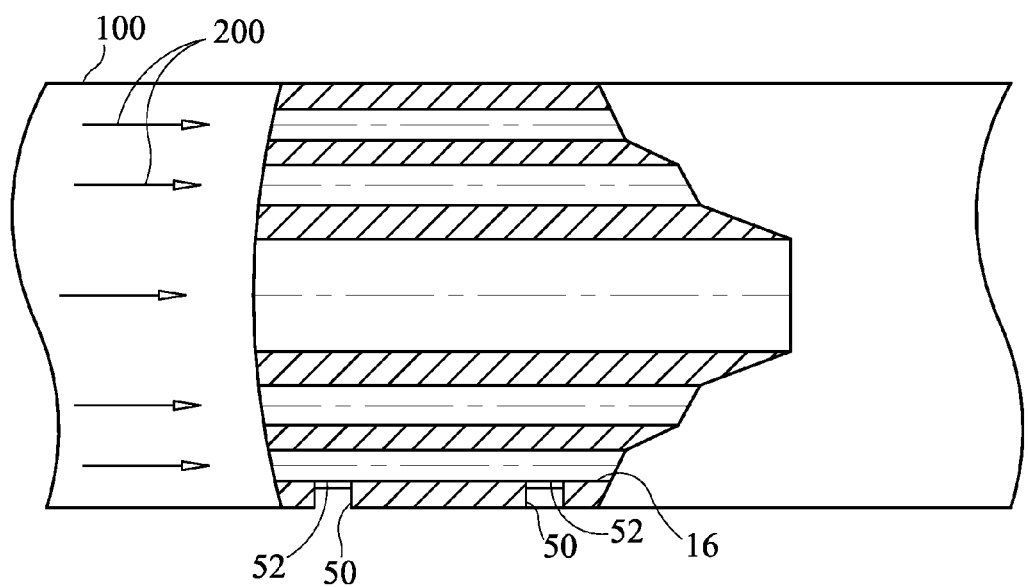
FIG. 9 is an axial cross-sectional view of a flow plug configured for and instrumented with sensors in accordance with another embodiment of the present invention.
Figure 10A:
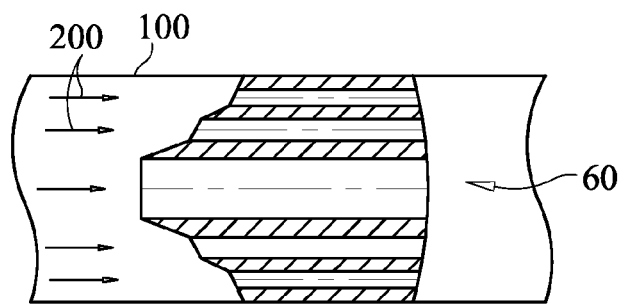
FIGS. 10A-10D are axial cross-sectional views of flow plugs in accordance with other embodiments of the present invention.
Figure 10B:
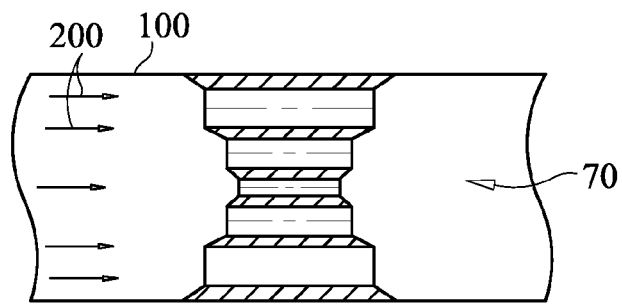
Figure 10C:
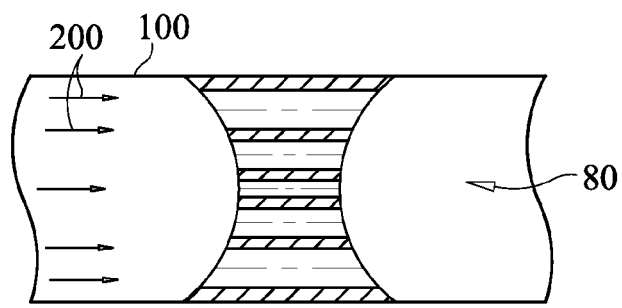
Figure 10D:
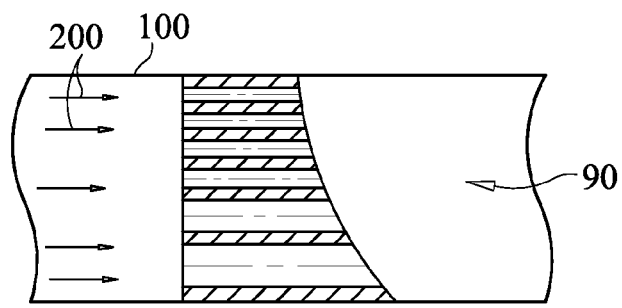

A flow plug configured with sensors is illustrated in FIG. 9 where radial holes 50 (e.g., two are shown) leading from the perimeter of plug 10 to a hole 16 extending through plug 10 as described above. It is to be understood that additional radial holes can be provided as needed for coupling to hole 16 and/or additional ones of holes 12, 14 and 16. A sensor 52 can be mounted at the juncture of radial hole 50 with hole 16. Sensor 52 is typically positioned to be flush with the portion of plug 10 that defines hole 16. Sensor 52 is typically a temperature or pressure sensor.

However, it is to be understood that sensor 52 is not so limited as sensor 52 can be optical, magnetic, acoustic, etc., without departing from the scope of the present invention.

Multiple holes/sensors can be used to establish measurement points anywhere along one or more of holes 12, 14 and/or 16 in plug 10. The location of the sensors in the fluid path is critical for measurement due to velocity profile changes and entrance effects. The location of the sensors must also account for the area change ratio for the standard orifice equation. As such, more than one sensor may need to be mounted in the same hole. By instrumenting flow plug 10 in this fashion, measurement hardware is kept completely out of the flow field. Note that traditional measurement schemes can also be combined with measurements made at the flow plug. Such traditional measurement schemes typically utilize measurements made upstream and/or downstream of the flow plug.

The above-described radial hole(s) can also be used to draw or pump another fluid into a plug's flow-through hole for mixing with fluid flow 200. More specifically, an empty hole 50 would have a vacuum created therein under certain conditions as fluid flow 200 moves through plug 10. This vacuum can be used to draw another fluid into the plug's respective flow-through hole (e.g., one of holes 12, 14 or 16). The additional fluid could also be pumped through hole 50 and into the plug's respective flow-through hole. Still further, when multiple radial holes 50 are provided, one or more could be instrumented with sensors and one or more could be left empty.

The advantages of the present invention are numerous. By utilizing a flow plug having length-to-size uniformity of each of the plug's holes, the flow's vena contracta is more uniform. In addition, the plug's coefficient of discharge is optimized thereby improving a flow meter's efficiency and accuracy.

Although the invention has been described relative to specific embodiments thereof, there are numerous variations and modifications that will be readily apparent to those skilled in the art in light of the above teachings. For example, FIGS. 10A-10D illustrate plugs 60-90, respectively, in order to show that a variety of plug/hole geometries can satisfy the criteria described herein. It is therefore to be understood that, within the scope of the appended claims, the invention may be practiced other than as specifically described.

What is claimed as new and desired to be secured by Letters Patent of the United States is:

1. A flow plug, comprising:
    a plug having a plurality of holes formed therethrough and adapted to be fitted in a conduit wherein a fluid flow in the conduit impinge on said plug and passes through said plurality of holes, said plug having a plug length at each of said holes wherein said plug length is defined in a direction coinciding with that of the fluid flow,
    each of said holes defined by a parameter indicative of size in terms of cross-sectional area thereof wherein a ratio of said plug length to said parameter is defined for each of said holes,
    said plug length varying such that said ratio is approximately equal for each of said holes and such that said plug length is different for at least two of said holes, wherein a vena contracta of the fluid flow is formed.

2. A flow plug as in claim 1, wherein each of said holes extends through said plug in a direction that is substantially parallel to the direction of the fluid flow in the conduit.

3. A flow plug as in claim 1, wherein at least a portion of said holes extend through said plug in non-parallel directions with respect to the direction of the fluid flow in the conduit.

4. A flow plug as in claim 1, further comprising at least one port formed in said plug, each said port having an origination at an exterior surface of said plug and a termination at one of said holes along a length thereof, wherein said origination is not exposed to the fluid flow in the conduit.

5. A flow plug as in claim 4, further comprising at least one sensor mounted in said port.

6. A flow plug as in claim 5, wherein said sensor is located within said port.

7. A flow plug as in claim 5, wherein said sensor is selected from the group consisting of pressure, temperature, optical, magnetic and acoustic sensors.

8. A flow plug as in claim 1, wherein, for each of said holes, said parameter is constant over said length.

9. A flow plug as in claim 1, wherein, for each of said holes, said parameter is averaged over said length.

10. A flow plug as in claim 1, wherein said holes comprise circular holes.

11. A flow plug as in claim 10, wherein said parameter comprises a diameter for each of said circular holes.

12. A flow plug as in claim 1, wherein said holes comprise slotted holes.

13. A flow plug as in claim 12, wherein said parameter comprises a slot width for each of said slotted holes.

14. A flow plug as in claim 1, wherein said holes comprise substantially V-shaped holes extending radially outward from a central portion of said plug.

15. A flow plug as in claim 14, wherein said parameter comprises an arc length for each of said substantially V-shaped holes.

16. A flow plug, comprising:
    a plug having a plurality of holes formed therethrough and adapted to be fitted in a conduit wherein a fluid flow in the conduit impinges on said plug and passes through said plurality of holes, said plug having a plug length at each of said holes wherein said plug length is defined in a direction coinciding with that of the fluid flow,
    each of said holes defined by a parameter that is constant over said plug length, said parameter being indicative of size in terms of cross-sectional area thereof wherein a ratio of said plug length to said parameter is defined for each of said holes,
    said plug length varying such that said ratio is approximately equal for each of said holes and such that said plug length is different for at least two of said holes, wherein a vena contracta of the fluid flow is formed; and
    at least one port formed in said plug, each said port having an origination at an exterior surface of said plug and a termination at one of said holes along the length thereof, wherein said origination is not exposed to the fluid flow in the conduit.

17. A flow plug as in claim 16, wherein each of said holes extends through said plug in a direction that is substantially parallel to the direction of the fluid flow in the conduit.

18. A flow plug as in claim 16, wherein at least a portion of said holes extend through said plug in non-parallel directions with respect to the direction of the fluid flow in the conduit.

19. A flow plug as in claim 16, further comprising at least one sensor mounted in said port.

20. A flow plug as in claim 19, wherein said sensor is located within said port.

21. A flow plug as in claim 19, wherein said sensor is selected from the group consisting of pressure, temperature, optical, magnetic and acoustic sensors.

22. A flow plug as in claim 16, wherein said holes comprise circular holes.

23. A flow plug as in claim 22, wherein said parameter comprises a diameter for each of said circular holes.

24. A flow plug as in claim 16, wherein said holes comprise slotted holes.

25. A flow plug as in claim 24, wherein said parameter comprises a slot width for each of said slotted holes.

26. A flow plug as in claim 16, wherein said holes comprise substantially V-shaped holes extending radially outward from a central portion of said plug.

27. A flow plug as in claim 26, wherein said parameter comprises an arc length for each of said substantially V-shaped holes.

* * * * *